(12) United States Patent
Schneider et al.

(10) Patent No.: US 8,950,402 B2
(45) Date of Patent: Feb. 10, 2015

(54) AUTONOMOUS $O_2$ CHANNEL EXTENDING IN THE LONGITUDINAL DIRECTION

(75) Inventors: Uwe Schneider, Jork Königreich (DE); Quirin Wahle, München (DE); Simon Knaak, Hamburg (DE); Thomas Vogt, Hamburg (DE)

(73) Assignee: Airbus Operations GmbH (DE)

(*) Notice: Subject to any disclaimer, the term of this patent is extended or adjusted under 35 U.S.C. 154(b) by 611 days.

(21) Appl. No.: 12/997,012

(22) PCT Filed: Jun. 12, 2009

(86) PCT No.: PCT/EP2009/057279
§ 371 (c)(1),
(2), (4) Date: Mar. 9, 2011

(87) PCT Pub. No.: WO2009/150223
PCT Pub. Date: Dec. 17, 2009

(65) Prior Publication Data
US 2011/0146686 A1 Jun. 23, 2011

Related U.S. Application Data

(60) Provisional application No. 61/131,930, filed on Jun. 13, 2008.

(30) Foreign Application Priority Data

Jun. 13, 2008 (DE) .................. 10 2008 028 258

(51) Int. Cl.
*A62B 18/02* (2006.01)
*B64D 13/00* (2006.01)

(52) U.S. Cl.
CPC ............ *B64D 13/00* (2013.01); *B64D 2231/02* (2013.01); *B64D 2231/025* (2013.01); *Y02T 50/44* (2013.01)
USPC .................................................. 128/205.25

(58) Field of Classification Search
CPC ..................... A61M 16/00; A61M 2016/0069; A61M 16/06; A61M 16/0683; A61M 16/12; A61M 2202/0208; A61M 16/18; A61M 16/104; A61M 2016/0021; A61M 16/0078; B63C 11/2227; B63C 11/24; A61F 5/08; A62B 7/14; B64D 11/00; B64D 11/003; B64D 45/0015; Y02T 50/46; Y02T 50/56
USPC ............ 128/205.25, 204.29, 204.18, 206.26, 128/205.11, 203.25, 204.21, 204.26, 128/205.17, 200.24; 244/118.5
See application file for complete search history.

(56) References Cited

U.S. PATENT DOCUMENTS 2,931,355 A 4/1960 Miller et al.
3,016,061 A * 1/1962 Maddock ..................... 137/81.1
(Continued)

FOREIGN PATENT DOCUMENTS

DE 19531916 A1 3/1997
EP 0394076 A1 10/1990
WO 2006116074 A1 11/2006

*Primary Examiner* — Tan-Uyen (Jackie) T Ho
*Assistant Examiner* — Mark Wardas
(74) *Attorney, Agent, or Firm* — Lerner, David, Littenberg, Krumholz & Mentlik, LLP

(57) ABSTRACT

The present invention is concerned with a system for the oxygen supply of persons in an aircraft. In order to provide the simplest possible system, which is suitable in particular for a reconfiguration of the seat devices (12), the system has at least one oxygen line, one oxygen feed, and multiple attachment points for oxygen masks (24), the oxygen line extending in the longitudinal direction and the attachment points being connected to the oxygen line. The attachment points are preferably situated linearly and are spaced apart from one another in the longitudinal direction.

12 Claims, 11 Drawing Sheets

(56) References Cited

U.S. PATENT DOCUMENTS

| | | |
|---|---|---|
| 3,330,506 A | 7/1967 | Robillard et al. |
| 3,503,394 A | 3/1970 | Holtz et al. |
| 3,981,300 A | 9/1976 | Williams |
| 5,078,343 A * | 1/1992 | Howlett ............ 244/118.5 |

* cited by examiner

AUTONOMOUS O₂ CHANNEL EXTENDING IN THE LONGITUDINAL DIRECTION

CROSS-REFERENCE TO RELATED APPLICATIONS

This application is a national phase entry under 35 U.S.C. §371 of International Application No. PCT/EP2009/057279, filed Jun. 12, 2009, published in German, which claims the benefit of the filing date of U.S. Provisional Patent Application No. 61/131,930, filed Jun. 13, 2008 and of German Patent Application No. 10 2008 028 258.8 filed Jun. 13, 2008, the entire disclosures of which are hereby incorporated herein by reference.

FIELD OF INVENTION

The present invention relates to a system for the oxygen supply of persons in an aircraft.

BACKGROUND OF THE INVENTION

Oxygen systems are provided in aircraft, for example, if the central pressurization of the cabin fails, which generally regulates the pressure compensation typically required in the case of rising altitude and the oxygen supply of the passengers connected thereto. For example, oxygen supply units are provided as cuboid containers in wide-body airplanes. These containers are typically integrated in the passenger supply duct PSC. Two different oxygen systems are used: chemical systems and systems having a central oxygen bottle. Depending on the system, different aircraft-side preparations result. The oxygen boxes are typically autonomous components which are individually activated. However, it has been shown that the configuration of the oxygen boxes must be performed individually for each airplane layout with respect to the seat positions, which in turn has effects on the overall PSC equipment, for example, with respect to the plurality of variants, and interface and gap concepts. The oxygen boxes, which are installed integrated in the PSC, must also be displaced upon each reconfiguration, i.e., upon each change of the cabin layout. Since they are safety-relevant parts, a new test must also be performed each time upon each displacement.

SUMMARY OF THE INVENTION

An object of the present invention therefore is to provide a simpler system for oxygen supply.

This object is achieved according to the invention by a system according to claim 1. Exemplary embodiments are described in the dependent subclaims.

In an exemplary embodiment it is provided that the system has at least one oxygen line, one oxygen feed, and multiple attachment points for oxygen masks, the oxygen line extending in a longitudinal direction and the attachment points being connected to the oxygen line.

The simplest possible component results through the linear extension of the oxygen line, which represents advantages not only with respect to the production costs, but rather also means savings in the weight, which represents a central aspect in the field of aircraft. Because of the connection of the attachment points to the oxygen line, the number of required components is reduced.

In a further exemplary embodiment, it is provided that the attachment points are linearly situated.

This allows the implementation of the simplest possible attachment points. In particular, a plurality of attachment points may be situated along the oxygen line, without additional separate distributor or adapter parts being required, as is typically the case. The attachment points are preferably attached directly to the oxygen line or the oxygen-conducting device. The attachment points may also be situated in bundles, for example. It is possible, for example, to combine the attachment points into groups of attachment points. Multiple such groups may then be situated over the length of the oxygen line, groups of attachment points and individual attachment points also being able to be combined with one another. A plurality of attachment points may be provided through the formation of groups, the interposed areas of the oxygen line being able to be implemented more simply through the bundling. For example, it is possible to situate the attachment points in a component, multiple components alternately being able to be assembled accordingly with corresponding simple line elements to form a part during the production of the oxygen line, for example.

In a further exemplary embodiment, it is provided that the attachment points are situated spaced apart from one another and one behind another in the longitudinal direction.

Thus, for example, uniform distribution of the attachment points along the oxygen line may be achieved, in order to allow uniform coverage with oxygen masks. The mentioned groups of attachment points may also be situated spaced apart and one behind another, for example.

A further exemplary embodiment provides that the attachment points are situated linearly and are situated spaced apart from one another and one behind another in the longitudinal direction.

This results in the simplest possible attachment situations, which are always identical, for the oxygen masks, for example. If the attachment points are situated in a uniform raster distance, for example, this also means that the fastening of the oxygen line can be adapted to this raster, i.e., the same geometric and construction conditions are provided at each of the fastening points. The raster can also be based on the higher-order raster distances of a supporting structure. In the case of a distance of the attachment points which is always equal, the production and handling is simplified in such a way that unnecessary waste does not arise in the case of linear production of the oxygen line as a semifinished product. The features relate to both individual attachment points and also groups of attachment points, the features also being able to be provided within the groups, which is not required, however. For example, groups of attachment points situated linearly and/or one behind another may also be implemented, the groups being able to be spaced apart from one another in the longitudinal direction.

In a further exemplary embodiment, it is provided that oxygen masks are removably connected to the oxygen line at a plurality of the attachment points.

The removable connection allows simple installation of the oxygen masks. Their loose attachment hose ends may preferably simply be pushed over a nipple located on the oxygen-conducting line. The nipple can be part of a valve device, for example, which is integrated in the oxygen line. However, the typically used closures may also be integrated, which first open in the event of a forceful pull on the oxygen mask, so that oxygen only flows out when it is intended. For this purpose, the masks hang on hoses. The hoses are long enough to be able to grasp the masks, or pull tabs are provided to reach the masks. However, even a large passenger must pull on the mask or the pull tab for use in front of the nose and mouth, whereby the closure opens, a further piece of hose is released, and the oxygen flows out.

In a further exemplary embodiment, a housing is provided, which has multiple receptacle compartments, each for multiple oxygen masks, and the receptacle compartments each have a closure flap, which can be opened in such a manner that the receptacle compartment is open downward in the open state and the oxygen masks which can be accommodated therein may fall out.

In the case of central activation of the closure flaps, the oxygen masks may thus be easily provided to the passengers. Of course, separate activation of the closure flaps is also possible. When not in use, the masks are securely stowed in the receptacle compartment and cannot be lost. The size of the receptacle compartments is oriented to simple handling when stowing the multiple masks in the compartment. Since one flap covers multiple masks, the number of moving parts and closure mechanisms is additionally reduced. If the number of masks per flap is relatively low, this also only means the failure of a small number of masks in the event of a defective flap. Of course, the flaps may also extend over multiple compartments.

In a further exemplary embodiment, the oxygen line has a pressurized high-pressure duct and a low-pressure duct.

This allows a central supply using the different systems, i.e., chemical systems or central systems. Depending on the pressure of the employed systems, a pressure reduction occurs between the high-pressure duct and the low-pressure duct in order to obtain a suitable pressure for the attachment points and the masks. The connection between the high-pressure duct and the low-pressure duct occurs via connection openings. The attachment points of the masks may preferably be provided directly on the low-pressure duct, possibly required valves being able to be implemented as integrated here. The connection openings reduce the pressure of the high-pressure duct to a suitable amount for the masks and the attachment points.

In a further exemplary embodiment, at least one oxygen source is situated in the high-pressure duct.

The oxygen source is made up, for example, of one or more oxygen bottles or one or more chemical systems, in which oxygen is generated or released by the procedure of a chemical reaction and thus provided. The high-pressure duct is dimensioned for this purpose so that it can receive oxygen bottles or chemical systems, or the container of the chemical systems, for example. Multiple smaller systems, fewer larger systems, or oxygen sources, or even only a single large system, or oxygen source, may be used. By providing the at least one oxygen source within the high-pressure duct, it is possible to dispense with a separate oxygen supply, which in turn means a reduction of the space requirement and a reduction of the installation outlay. Multiple individual oxygen sources come into consideration as the oxygen source, as well as an oxygen source extending on a majority of the length of the actual oxygen line, or the high-pressure duct. The oxygen is released from the oxygen source into the high-pressure duct on demand and then relayed via the low-pressure duct to the masks. The pressure regulation via the connection points between high-pressure duct and low-pressure duct allows an adaptation to the different oxygen sources, i.e., the attachment points may be implemented differently depending on the oxygen source and the pressure generated thereby. If oblong containers are used as the oxygen source, whose external diameter corresponds to the internal diameter of the high-pressure duct, it is further possible to use the housing or container of the oxygen source or the multiple oxygen sources as a supporting element or as supporting elements, i.e., the high-pressure duct can be additionally stabilized by the oxygen sources and thus span further, i.e., fastened on fewer points on the supporting structure of the aircraft, and/or can be implemented using less material, i.e., lighter and more cost-effectively.

In a further exemplary embodiment, the low-pressure duct is implemented as segmented and is sequentially connected to the high-pressure duct, and the attachment points for the oxygen masks are provided on the low-pressure duct.

The sequential connection to the pressurized oxygen line has the advantage that better adaptation to the pressure suitable for the masks and more uniform oxygen supply are thus possible. The segmented implementation additionally allows simple production and installation, e.g., by placing individual injection-molded or extruded parts on one another.

In a further exemplary embodiment, the high-pressure duct and the low-pressure duct are integrated in the housing and the housing has fastening devices for installation on supporting elements of the aircraft.

This allows the most space-saving possible embodiment and, for example, also a one-piece production, for example, by extrusion methods. In addition, the installation also simplified by the reduction of the number of parts. The installation time is also reduced. In addition, the number of interfaces is reduced. Separate hose clamps or similar parts are not necessary due to the fastening devices on the housing. The closed oxygen duct is fastened directly on the frames (lateral) or on an auxiliary structure (central) which is independent of the storage devices. The design of the system according to the invention, which is independent of the other installations, allows decoupling of the parts having a different DAL (design assurance level), i.e., parts having different safety requirements are installed separately. The installation is performed independently of the installation of the hat racks, preferably chronologically before the installation of the hat racks. The accessibility of the oxygen system is ensured independently of the seat layout. A significant cost savings is achieved overall. The longitudinally-oriented implementation also allows visual identification of the improved safety device. For example, it is possible to accentuate the duct by coloring, in order to notify the passengers of this new technology. Such accentuation, which is also referred to as safety branding, is known from automobile manufacture, for example, where airbags are identified.

In a further exemplary embodiment, it is provided that, in an aircraft, at least one oxygen line runs in the longitudinal direction of the aircraft, the oxygen line being situated above seat devices for passengers or crewmembers.

Through the implementation above the seat devices, the oxygen masks may fall directly into the grasping range of the passengers. Depending on the configuration of the passengers in the transverse direction, multiple longitudinally running lines may also be provided. Transversely running spur lines are then not required in any case.

In a further exemplary embodiment, it is provided that the aircraft has a number of seating areas, which are separated from one another by aisle areas running in the longitudinal direction, and at least one oxygen line running in the longitudinal direction is situated over each seating area.

It is thus ensured that in case of emergency, each passenger can grasp a mask from his seat. The configuration parallel to the airplane longitudinal axis results in the least possible engagement in the space above the passengers provided for the fixtures. For example, storage compartments, so-called hat racks, are also distinguished by a longitudinally-oriented implementation. Through the longitudinal orientation of the oxygen line, the space for the hat racks is not restricted or is only restricted insignificantly.

In a further exemplary embodiment, it is provided that more attachment points are provided than the maximum number of the seat devices and the attachment points are spaced apart from one another such that with any desired seating, the legally required number of masks can be assigned to each seat device, i.e., one oxygen mask can be assigned and the corresponding legal regulations for their accessibility are fulfilled.

It is thus fundamentally ensured that the legally required redundancy can be provided, i.e., one mask is on board per passenger, plus at least 10% additional masks. The mentioned spacing also allows grasping of the mask for small passengers. The layout for the maximum seating does mean keeping excess masks in reserve for a looser seating. However, heavy devices are not kept in reserve, but rather fundamentally only additional masks made of plastic and the additional attachment points. However, these are not very consequential. The costs for redundancy are also reduced to a minimum, above all if one considers the savings in the case of retrofitting measures.

In a further exemplary embodiment, it is provided that installations are situated above the seat devices, and the at least one oxygen line and the multiple attachment points for the oxygen masks are integrated in the installations.

The installations, or fixtures, can be storage compartments for the hand luggage, for example, i.e., hat racks. The integration allows simplified installation. In addition, the system according to the invention may thus be adapted well to different cabin designs. For example, the duct can be integrated in the hat rack module in the hat rack length. Through the integration of the system in the hat rack, for example, pre-installation can also be performed outside the airplane cabin, which allows optimization of the installation procedure. Furthermore, the fixtures may also be implemented having special fastening devices, for example, so that the system may be fastened more easily to the fixtures, both during the pre-installation and also during the installation in the cabin area.

In a further exemplary embodiment it is provided that the attachment points can be equipped with oxygen masks in a fixed excess capacity as a function of the seating.

This is required in order to compensate for the failure of individual masks, which can never be entirely prevented. The equipping is performed such that only the required redundancy is provided and no superfluous masks are installed. Since the equipping is a simple attachment procedure, for example, plugging or pushing a hose end on a nipple, the adaptation can be performed simply and cost-effectively. In addition, the adaptation by equipping offers the advantage that further safety approval of the system is not required when the aircraft has been equipped with a different seating.

In a further exemplary embodiment, an aircraft having a system for oxygen supply according to one of the above-described exemplary embodiments is provided.

The object is also achieved by the use of a system for oxygen supply according to one of the above-mentioned embodiments in an aircraft.

The system according to the invention is alternatively suitable for multiple systems, for example, for the use as a central oxygen system having a central oxygen bottle in the cargo space. The central oxygen bottle is connected via a connection line to the system, i.e., the pressurized oxygen duct. The mask compartments are equipped as needed or according to layout. In case of triggering, the closure flaps open via a central bolt, i.e., only one separate DAL B cable is required per duct. In case of triggering, the oxygen duct is immediately pressurized by the central oxygen bottle. Each mask which is grasped and pulled is supplied via the pressurized oxygen duct.

In addition, the system is also suitable for use as a partially-centralized oxygen system having extra-long oxygen high-pressure container, instead of the pressurized oxygen duct. Alternatively, an extra-long oxygen reactor can also be used. The mask compartments are also equipped as needed or according to layout here. In case of triggering, the closure flaps open via a central bolt, i.e., only one separate DAL B cable is also provided per duct here. In case of triggering, the separate low-pressure oxygen duct is immediately pressurized via the high-pressure oxygen container or the oxygen reactor. Similarly as in the preceding use, every mask which is pulled on is supplied via the pressurized low-pressure oxygen duct.

Finally, the system is also suitable for use as a chemical oxygen system having multiple chemical oxygen reactors in non-equipped mask compartments—having connection to the pressurized oxygen duct. The equipping of the mask compartments and the opening of the flaps via a central bolt are performed as in the above-mentioned example. In case of triggering, the oxygen duct is immediately supplied with pressure from the mask compartments equipped with chemical oxygen reactors, so that each mask is supplied.

In the scope of the present invention, the term aircraft not only comprises airplanes, but rather also helicopters or airships, for example, although the invention relates in particular to a commercial airplane, in particular a passenger airplane.

SHORT DESCRIPTION OF THE DRAWINGS

The invention is explained in greater detail hereafter on the basis of an exemplary embodiment with reference to the appended drawings for further explanation and for better understanding. In the figures.

DETAILED DESCRIPTION OF PREFERRED EXEMPLARY EMBODIMENTS OF THE INVENTION

Figure 1:
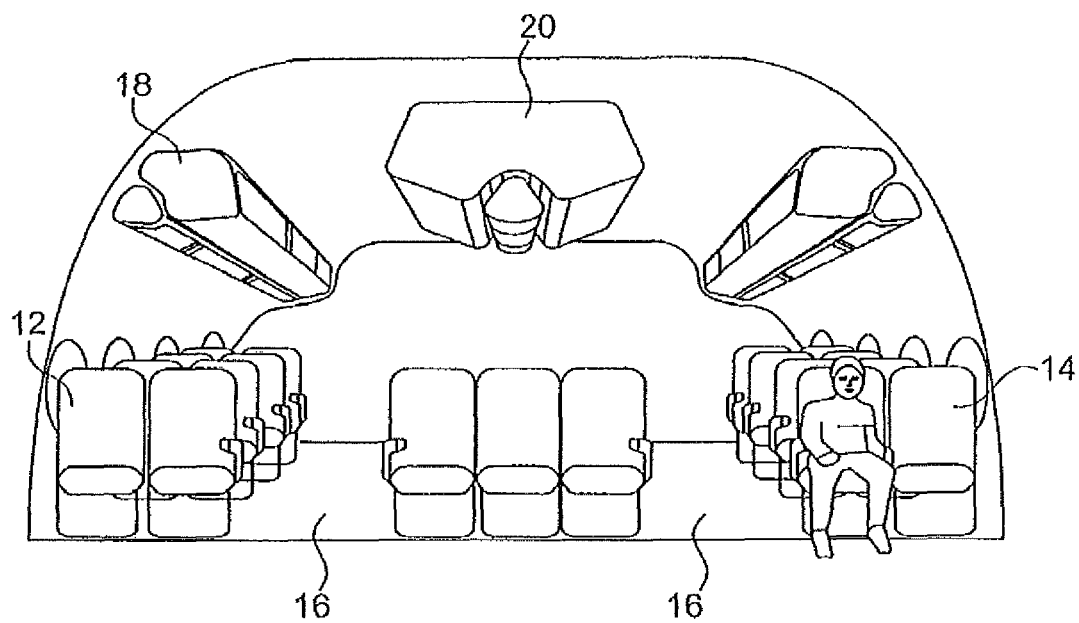
FIG. 1 shows an interior perspective of an airplane cabin.
Figure 2:
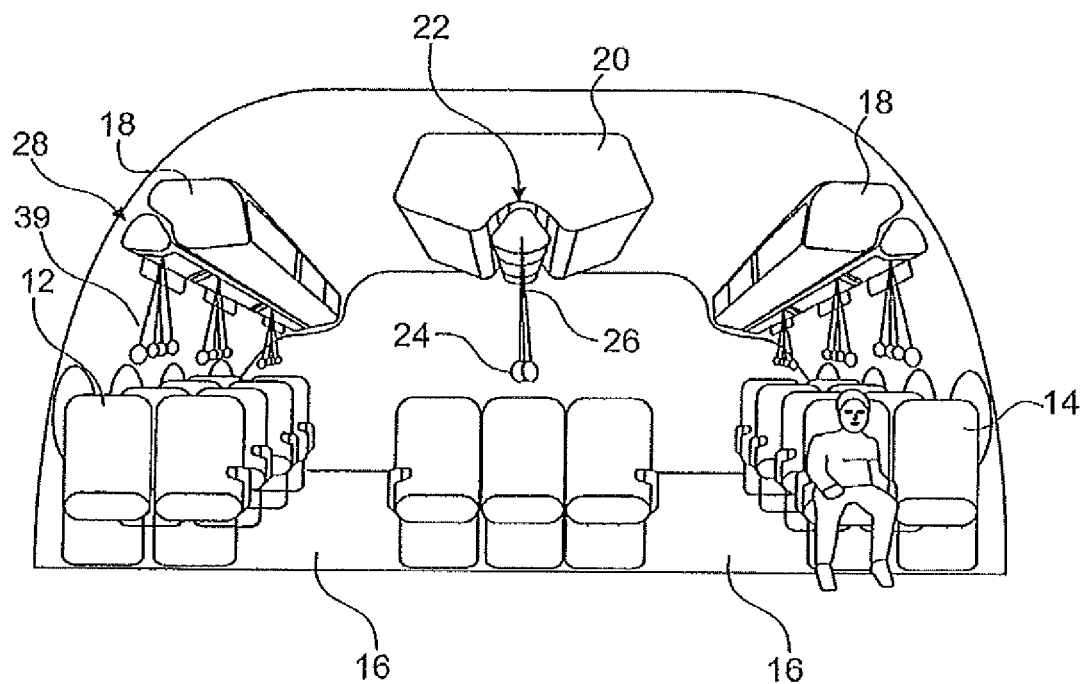
FIG. 2 shows the airplane cabin from FIG. 1 having oxygen masks hanging down according to the invention.

FIGS. 1 and 2 show an airplane cabin having indicated seating. The seating shown provides two seat devices 12 in a row along the cabin outer wall 14 in each case and four seat devices 12 in the middle area, the outer areas each being separated from the middle area by an aisle area 16. Only the front two of the rows are shown having the complete number of seat devices 12. In addition, the left outer wall is not shown in the figures.

Storage compartments 18, so-called hat racks, whose lateral flaps are not shown for better understanding, are located above the seat devices 12 in the area of the lateral seating areas. A middle storage device 28 for the hand luggage of the passengers, for example, is located above the middle seating area.

An oxygen supply 22 for the persons in the aircraft is situated in the middle area of the middle storage device 20 in FIG. 2. This oxygen supply 22 is described in greater detail on the basis of FIGS. 3 to 13. In FIG. 2, the oxygen supply 22 is shown in the activated state, i.e., in an emergency or practice situation, in which the passengers must be supplied with oxygen, e.g., in the event of failure of the pressurization of the cabin. Of course, the oxygen supply 22 is also suitable for the oxygen supply of crewmembers. In this case, it is situated above the corresponding seat devices of the crew.

To supply the persons, the oxygen supply 22 has oxygen masks 24, which are connected via a hose 26 to an oxygen line (not shown in FIG. 2) and hang down from above as needed on a pull line 39. In this hanging position, the oxygen masks 24 can be grasped well by the persons.

The oxygen supply 22 is implemented as linear and runs in the longitudinal direction of the airplane. The oxygen masks 24 are situated linearly and spaced apart from one another in the longitudinal direction. The hoses 26 of a mask compartment are mounted on a common drop point (suspension point), which corresponds to the current prior art. Alternatively, it is also possible to situate the hoses 26 at a distance to one another, in order to prevent twisting or tangling thereof as much as possible.

An oxygen supply 28, which essentially corresponds to the oxygen supply 22 provided in the middle area, is also provided above each of the outer two seat areas. Differences only result from the different boundary conditions, i.e., attachment geometries, because of the differently implemented storage devices, and the smaller number of the seat devices.

The oxygen supply 28 of the outer seat areas will be explained in greater detail hereafter. For this purpose, a perspective sectional view having the immediate surroundings is shown in a detail in FIGS. 3 to 5. A section is shown parallel thereto in each of FIGS. 6 to 8.

The oxygen supply 28 has an oxygen line 30, which is attached to an oxygen feed (not shown) and extends in the longitudinal direction of the airplane. Attachment points (not shown), which are situated linearly and are spaced apart from one another in the longitudinal direction, are provided for attaching the oxygen masks 24 using the hoses 26. The attachment points are preferably situated one behind another in the longitudinal direction. The attachment points are connected to the oxygen line 30. Furthermore, it is provided that the attachment points are implemented so that the oxygen masks 24 may be removably connected to the oxygen line 30.

The number of the attachment points and their distance are defined by the relevant safety regulations. These provide that one oxygen mask 24 must be provided for every passenger on board, plus a reserve of at least 10%, since a failure of the masks may never be entirely prevented. The number of the passengers is determined by the number of the provided seat devices.

The configuration of the seat devices is nowadays designed flexibly, however, so that different seating variants may be implemented within a given cabin layout. The configuration of the seat devices not only varies in the distance of the rows to one another, but rather also in the distance in the transverse direction, i.e., in the number of seats per row. A change of the seat configuration can result, for example, if the seating and the interior equipment are replaced, the storage devices also often being replaced then. A change of the seat configuration can also be required for economic reasons, however, if only the number of passengers is to be increased or decreased. The existing seats are simply pushed closer together or pushed away from one another.

However, a sufficient oxygen supply must also be ensured in the event of a changed seat configuration. In the case of known oxygen supplies, the oxygen supply must also be reconfigured in the event of a reconfiguration of the seats. Since the oxygen supply is a safety-relevant component, which is subject to special regulations, a further testing method is additionally also required.

According to the present invention, an oxygen supply is provided, which allows the configuration of the seat devices 12 to be changed without the oxygen system having to be changed in its permanently installed components. The system of the present invention provides designing the number of the attachment points for a maximum of the seating, plus the required reserve, for this purpose. In the event of a reduction of the seats, the system does not have to be changed, since no direct geometric relationship exists between the oxygen supply and the seat configuration. The longitudinally-oriented oxygen line allows a comprehensive supply. In the event of corresponding width and existing aisle areas, of course, multiple longitudinally-oriented oxygen lines, or certainly also multiple oxygen lines per seat area zone, are required to ensure the ready access for all passengers.

A system is provided according to the invention, which provides a redundancy in the number of the attachment points and optionally also the masks. In the event of decreased seating, the masks may also be easily decoupled and stored separately. If needed, more masks are attached to the attachment points again. Since the line itself does not have to be changed, a test is also not required.

The provision of the maximum number of attachment points does mean an additional outlay during the production and installation and a small amount of additional weight. However, the additional outlay is to be compared to the outlay which is typically required if an adaptation of the oxygen supply is required in the course of a change of the seat configuration. The system according to the invention also represents an improvement with respect to the weight in comparison to the typical configuration having transverse distribution lines. The additional outlay for the maximum number of the masks is comparatively small, if adaptation of the system is thus no longer required. The system according to the invention is fundamentally capable of ensuring the required safety in the event of a change of the seat configuration, without the system requiring a change.

Figure 3:
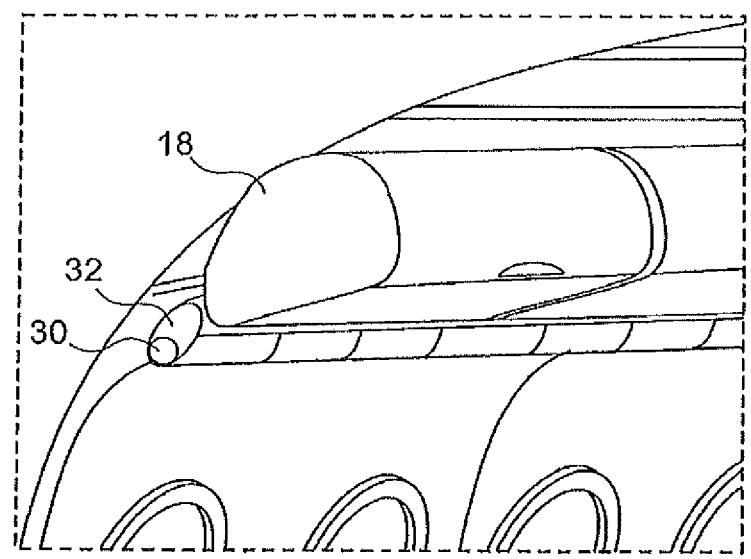
FIG. 3 shows a perspective view of an oxygen supply system situated in the transition area between the cabin wall and a storage device.
Figure 4:
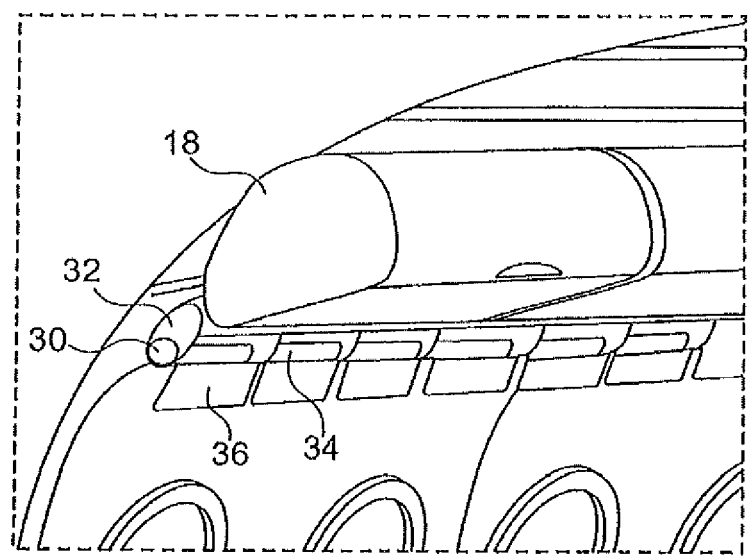
FIG. 4 shows the oxygen supply system from FIG. 3 with opened closure flaps.

In the exemplary embodiment shown in FIGS. 3 to 8, the oxygen line 30 is situated in a housing 32, which is connected via fastening devices to supporting parts of the airplane structure. For this purpose, the housing can comprise multiple parts, which are each installed over a length of four frames of the airplane fuselage, for example. The housing 32 has multiple receptacle compartments 34 for multiple oxygen masks 24 in each case. The receptacle compartments 34 each have a closure flap 36, which can be opened in such a way that the receptacle compartment 34 is open downward in the open state, as shown in FIG. 4, and the oxygen masks 24 received therein may fall out. For example, in FIG. 4, a housing part 6 extending over four frames has flaps 32 every 14 inches to receive four masks 24 each. The control of the opening of the closure flap 36 is performed centrally.

In addition, in the exemplary embodiment shown, the housing 32 is fastened on the supporting structure so that it may be pivoted away downward (see FIG. 5), in order to be able to remove the storage compartments 18 independently from the oxygen supply 28.

In another exemplary embodiment, the oxygen line and the attachment points for the oxygen masks are integrated in the construction of the storage compartments. Further savings in the production, the weight, and the installation may thus be achieved.

Figure 5:
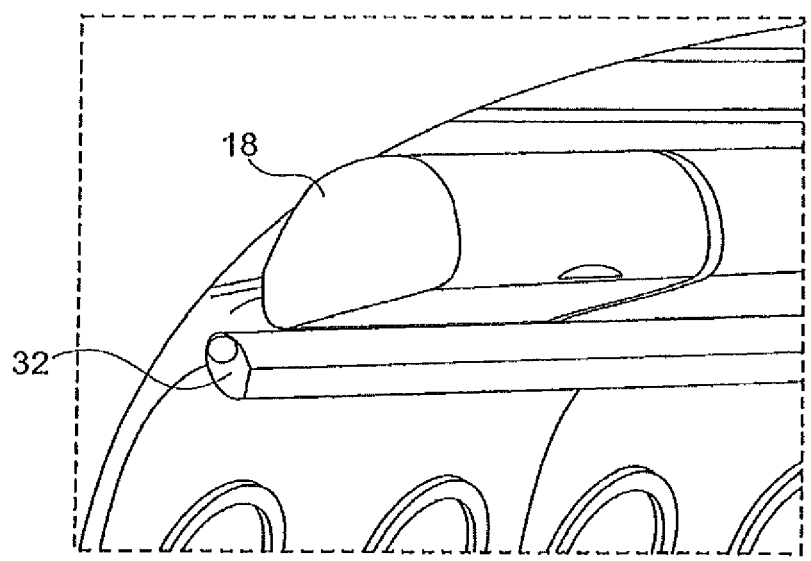
FIG. 5 shows the oxygen supply system from FIGS. 3 and 4 having housing strand pivoted down to reconfigure the storage device.
Figure 6:
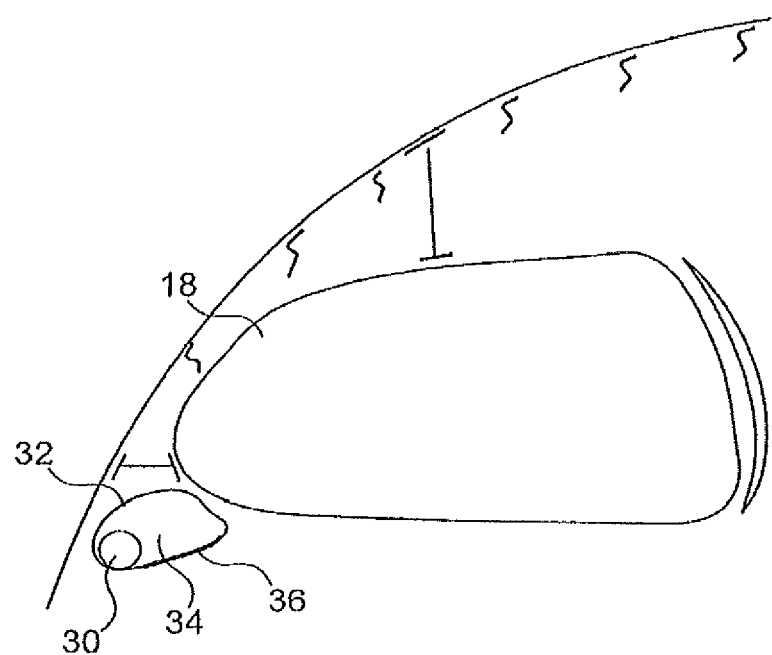
FIG. 6 shows a cross-section through the oxygen supply system and the storage device from FIGS. 3 to 5.
Figure 7:
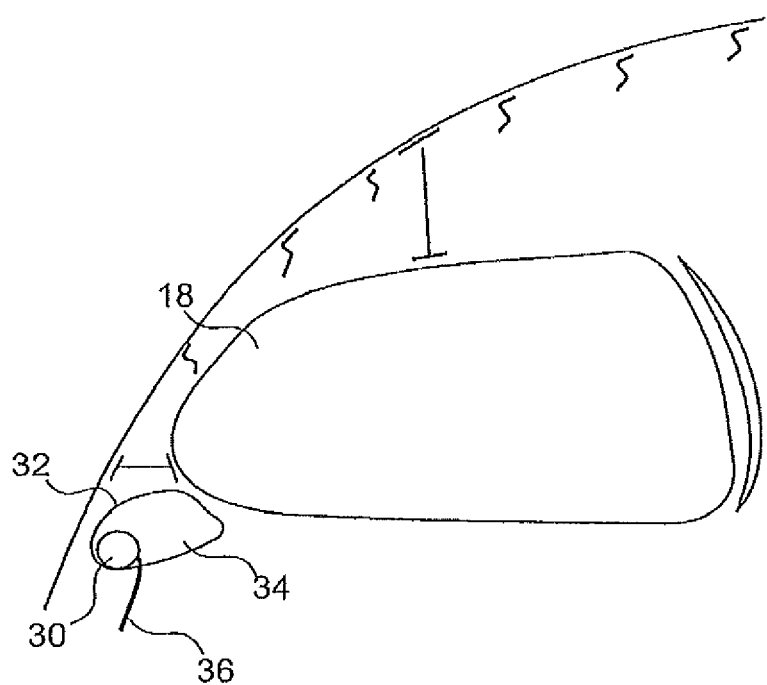
FIG. 7 shows the oxygen supply system from FIG. 6 with opened closure flaps.
Figure 8:
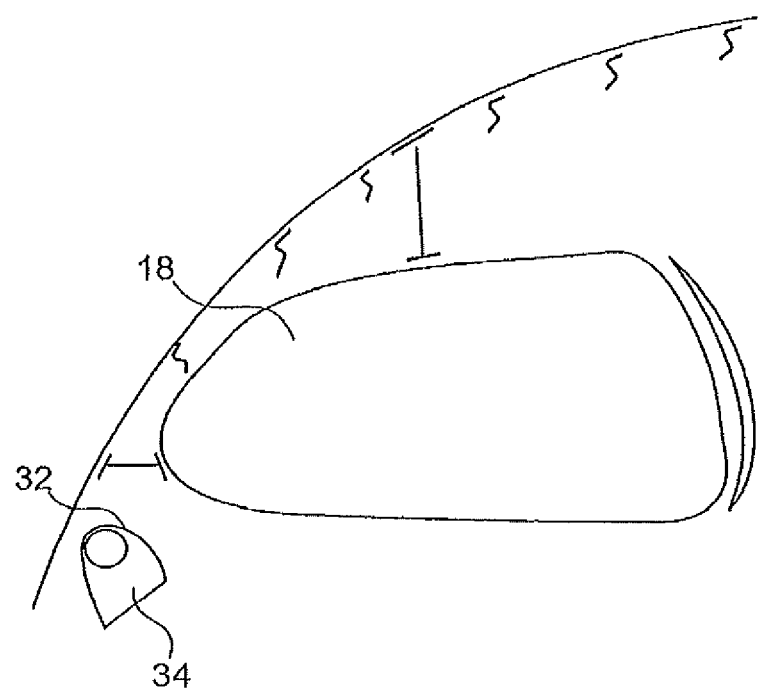
FIG. 8 shows the oxygen supply system from FIGS. 6 and 7 having housing strand pivoted down to reconfigure the storage device.

It may be clearly seen in FIGS. 6 to 8 that the oxygen supply according to FIGS. 3 to 5 can be visually incorporated in the fixtures of the cabin, but is independent in construction from the storage device. FIG. 6 shows the housing 32 in the normal position having closed closure flaps 36. In FIG. 7, the already discussed emergency situation is shown, in which the flaps 36 are open downward and the masks 24 (not shown) hang downward out of them. FIG. 8 shows that the housing 32 can be pivoted downward to reach the fastening points of the storage device 18. Because of the configuration in the area of the transition from the cabin wall into the storage device 18, the oxygen supply according to the invention may be integrated very well in various cabin layouts. The configuration in the join/transition area additionally also means that different tolerances can be used at these points, since the transition is visually concealed by the housing 32.

Figure 9:
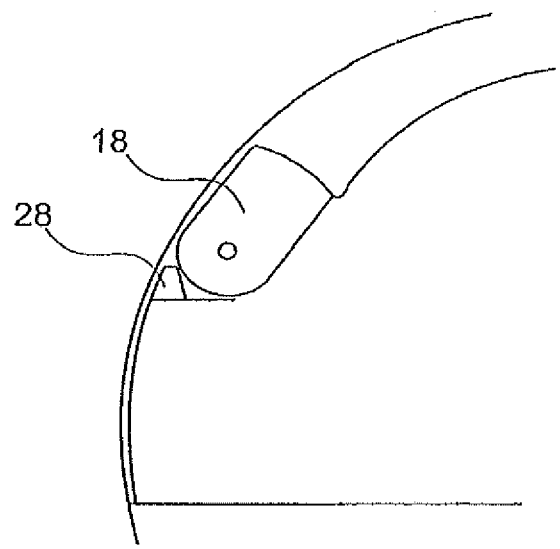
FIG. 9 shows a schematic section through a cabin wall having a further embodiment of the oxygen supply system.
Figure 10:
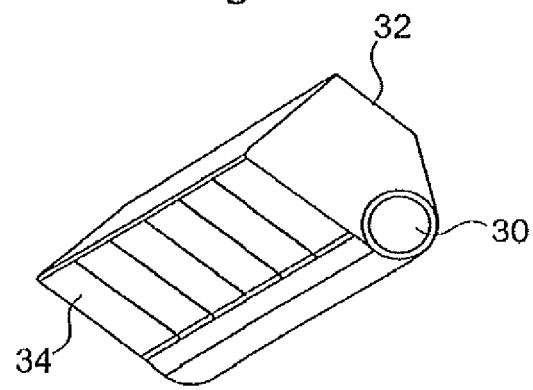
FIG. 10 shows an isometric view diagonally from below of a segment of the oxygen supply.
Figure 11:
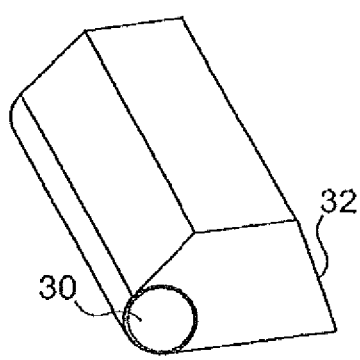
FIG. 11 shows an isometric view diagonally from above of the segment according to FIG. 10.

FIG. 9 shows in a further exemplary embodiment that the housing 32 can also be implemented as trapezoidal in such a way that the oxygen line 30 runs upward and the receptacle compartments 34 are situated pointing downward. Furthermore, an isometric illustration of a segment of the housing 32 is shown in FIG. 10. In addition to the configuration of multiple masks 24 in one receptacle compartment 34, individual compartments 34 for individual masks 24 may also be implemented, multiple compartments 34 being able to be closed using a common closure flap 36. FIG. 11 shows the housing segment in a view diagonally from above.

Figure 12:
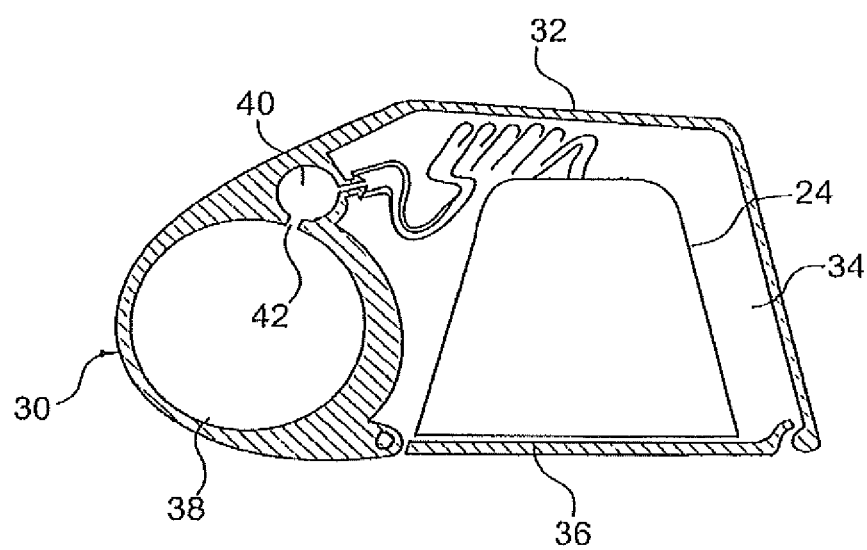
FIG. 12 shows a cross-section through an exemplary profile of the oxygen supply.

FIG. 12 shows an exemplary embodiment of the housing 32 in section. The oxygen line 30 has a pressurized high-pressure duct 38 and a low-pressure duct 40 here. The high-pressure duct 38 and the low-pressure duct 40 have been produced in one piece with the housing 32, for example, by extrusion methods. The low-pressure duct 40 is connected via connection openings 42 to the high-pressure duct. The attachment points of the masks 24 are provided directly on the low-pressure duct 40, possibly required valves being able to be implemented as integrated here. The connection opening 42 reduce the pressure of the high-pressure duct 38 to an amount suitable for the masks 24 and the attachment points. The high-pressure duct 38 is dimensioned such that it can also be used to accommodate oxygen bottles or chemical systems, or the containers of the chemical systems. Multiple smaller systems, fewer larger systems, or even only one single large system may be used.

Through a segmented implementation of the high-pressure duct 38 and through sequential connection of the low-pressure duct 40, better distribution and safety can be achieved in the event of failure of individual segments. The implementation having multiple connection openings between the high-pressure duct 38 and the low-pressure duct 40 additionally allows precise regulation of the pressure drop, or pressure damping, so that an equal amount of oxygen is available everywhere.

Figure 13:
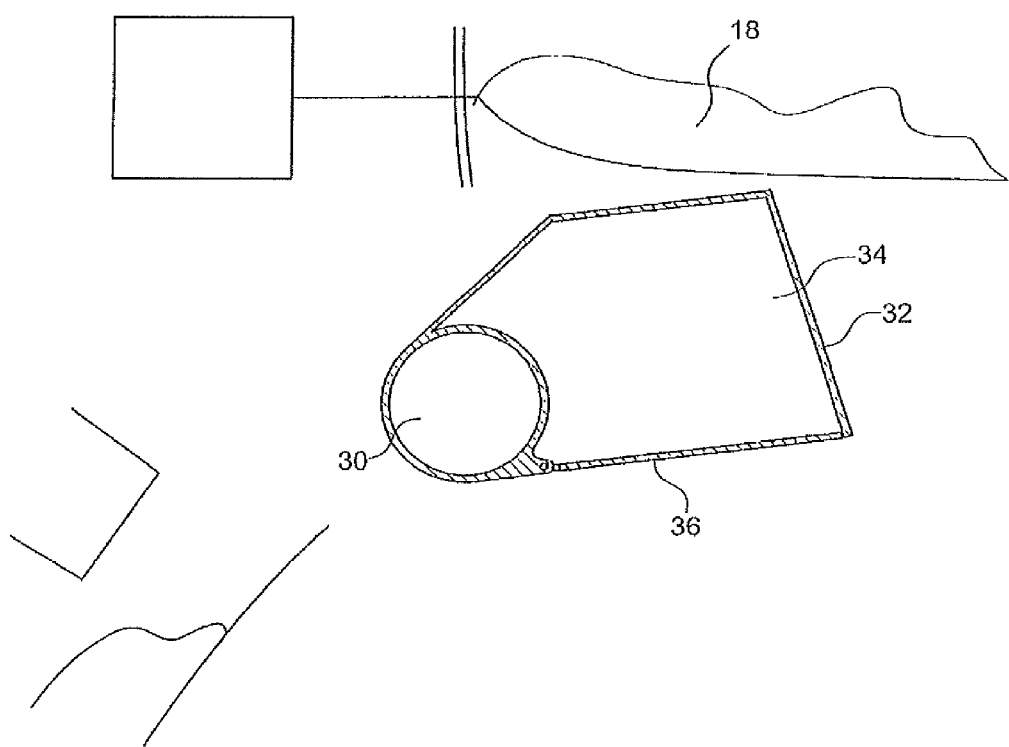
FIG. 13 shows a cross-section through the profile of the oxygen supply in connection with adjoining cabin space paneling and storage device.

Finally, the housing 32 from FIG. 12 is shown in FIG. 13 in connection with the surrounding fixtures and the supporting airplane structure.

Moreover, it is to be noted that "comprising" does not exclude other elements or steps and "a" or "an" does not exclude multiples. Furthermore, it is to be noted that features or steps which have been described with reference to one of the above exemplary embodiments may also be used in combination with other features or steps of other exemplary embodiments described above. Reference numerals in the claims are not to be viewed as a restriction.

The invention claimed is:

1. A system for supplying oxygen to persons in an aircraft comprising:
   at least one oxygen line extending in only a longitudinal direction of the aircraft;
   one oxygen feed; and
   a plurality of attachment points attached directly to the at least one oxygen line for oxygen masks,
   wherein the attachment points for the oxygen masks are situated linearly and in the longitudinal direction along the at least one oxygen line, the attachment points being spaced apart from one another and arranged one behind another in the longitudinal direction on the at least one oxygen line,
   wherein the oxygen masks are removably connected to the at least one oxygen line each via a hose at the plurality of the attachment points, and
   wherein the at least one oxygen line has a pressurized high-pressure duct and a low-pressure duct.

2. The system according to claim 1, further comprising a housing for the at least one oxygen line, the housing having multiple receptacle compartments for multiple oxygen masks, the receptacle compartments each having a closure flap movable in such a way that the receptacle compartment is open downwardly in the open state, thereby allowing the oxygen masks accommodated therein to fall out.

3. The system according to claim 1, wherein the low-pressure duct is segmented and sequentially connected to the high-pressure duct, and wherein the attachment points for the oxygen masks are provided on the low-pressure duct.

4. The system according to claim 1, wherein at least one oxygen source is situated in the high-pressure duct.

5. The system according to claim 1, wherein the high-pressure duct and the low-pressure duct are integrated in a housing having fastening devices for installation on supporting elements of the aircraft.

6. The system according to claim 1, wherein the at least one oxygen line is situated above seat devices for passengers or crewmembers.

7. The system according to claim 6, wherein the aircraft has a number of seating areas, which are separated from one another by aisle areas running in the longitudinal direction, and wherein the at least one oxygen line is situated over each seating area.

8. The system according to claim 6, wherein the number of attachment points is larger than the maximum number of the seat devices, and wherein the attachment points are spaced apart from one another in such a way that a predetermined number of masks are assigned to each seat device.

9. The system according to claim 6, further comprising fixtures situated above the seat devices, and wherein the at least one oxygen line and the plurality of attachment points for the oxygen masks are integrated in the fixtures.

10. The system according to claim 6, wherein the attachment points are equipped with oxygen masks as a function of a seating arrangement with a fixed overcapacity.

11. An aircraft comprising a system for supplying oxygen, the system comprising:
- at least one oxygen line extending in only a longitudinal direction of the aircraft;
- one oxygen feed; and
- a plurality of attachment points attached directly to the at least one oxygen line for oxygen masks,
- wherein the attachment points for the oxygen masks are situated linearly and in the longitudinal direction along the at least one oxygen line, the attachment points being spaced apart from one another and arranged one behind another in the longitudinal direction along the at least one oxygen line,
- wherein the oxygen masks are removably connected to the at least one oxygen line each via a hose at the plurality of the attachment points, and
- wherein the at least one oxygen line has a pressurized high-pressure duct and a low-pressure duct.

12. A system for supplying oxygen to persons in an aircraft comprising:
- at least one oxygen line extending in only one direction of the aircraft;
- an oxygen feed; and
- a plurality of attachment points attached directly to the at least one oxygen line for oxygen masks,
- wherein the attachment points for the oxygen masks are situated linearly and in the longitudinal direction along the at least one oxygen line, the attachment points being spaced apart from one another and arranged one behind another in the longitudinal direction on the at least one oxygen line,
- wherein the oxygen masks are removably connected to the at least one oxygen line each via a hose at the plurality of the attachment points, and
- wherein the at least one oxygen line has a pressurized high-pressure duct and a low-pressure duct.

* * * * *